United States Patent
McCrary (10) Patent No.: US 12,014,442 B2
(45) Date of Patent: Jun. 18, 2024

(54) CROSS GPU SCHEDULING OF DEPENDENT PROCESSES

(71) Applicant: ADVANCED MICRO DEVICES, INC., Santa Clara, CA (US)

(72) Inventor: Rex Eldon McCrary, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 397 days.

(21) Appl. No.: 16/721,450

(22) Filed: Dec. 19, 2019

(65) Prior Publication Data

US 2021/0192672 A1   Jun. 24, 2021

(51) Int. Cl.
*G06T 1/20*   (2006.01)
*G06F 9/38*   (2018.01)
*G06F 9/48*   (2006.01)

(52) U.S. Cl.
CPC .............. *G06T 1/20* (2013.01); *G06F 9/3838* (2013.01); *G06F 9/4881* (2013.01)

(58) Field of Classification Search
CPC ....... G06T 1/20; G06F 9/3838; G06F 9/4881; G06F 9/4812
USPC .......................................................... 345/522
See application file for complete search history.

(56) References Cited

U.S. PATENT DOCUMENTS

| | | | |
|---|---|---|---|
| 2003/0212860 A1* | 11/2003 | Jiang ..................... | G06F 3/0689 711/156 |
| 2006/0090044 A1* | 4/2006 | Hillier ................... | G06F 9/3004 711/155 |
| 2006/0129660 A1* | 6/2006 | Mueller ................. | G06F 9/546 709/220 |
| 2008/0189501 A1* | 8/2008 | Irish ..................... | G06F 13/1631 711/E12.001 |
| 2008/0215817 A1* | 9/2008 | Nonogaki ........... | G06F 12/0837 711/E12.017 |
| 2014/0184623 A1* | 7/2014 | Frascati ................ | G06T 15/005 345/522 |
| 2017/0123849 A1* | 5/2017 | Tian ........................ | G06F 9/522 |
| 2017/0147411 A1* | 5/2017 | Kobori ..................... | G06F 9/52 |
| 2019/0034151 A1* | 1/2019 | Dutu ........................ | G06T 1/20 |

* cited by examiner

*Primary Examiner* — James A Thompson
*Assistant Examiner* — Kim T Tran (57) ABSTRACT

A primary processing unit includes queues configured to store commands prior to execution in corresponding pipelines. The primary processing unit also includes a first table configured to store entries indicating dependencies between commands that are to be executed on different ones of a plurality of processing units that include the primary processing unit and one or more secondary processing units. The primary processing unit also includes a scheduler configured to release commands in response to resolution of the dependencies. In some cases, a first one of the secondary processing units schedules the first command for execution in response to resolution of a dependency on a second command executing in a second one of the secondary processing units. The second one of the secondary processing units notifies the primary processing unit in response to completing execution of the second command.

20 Claims, 5 Drawing Sheets

| DEPENDENCY TABLE 300 ||| 
|---|---|---|
| COMMAND ID | GPU ID | RESOLVED? |
| C-ID-1 | G-ID-1 | NO |
| C-ID-2 | G-ID-2 | NO |
| C-ID-3 | G-ID-1 | YES |
| ⋮ | ⋮ | |
| C-ID-N | G-ID-2 | NO |

CROSS GPU SCHEDULING OF DEPENDENT PROCESSES

BACKGROUND

The physical resources of a graphics processing unit (GPU) include shader engines and fixed function hardware units that are used to implement user-defined reconfigurable virtual pipelines. For example, a conventional graphics pipeline for processing three-dimensional (3-D) graphics is formed of a sequence of fixed-function hardware block arrangements supported by programmable shaders. These arrangements are usually specified by a graphics application programming interface (API) processing order such as specified in specifications of Microsoft DX 11/12 or Khronos Group OpenGL/Vulkan APIs. Each virtual pipeline supported by the GPU is fed via one or more queues (sometimes referred to as user queues) that hold commands that are to be executed in the virtual pipeline and a context that defines the operational state of the virtual pipeline. Some embodiments of the queues are implemented as ring buffers using a head pointer and a tail pointer. The commands are grouped into command buffers that include a predetermined number of commands. Examples of commands in the command buffers include draw commands and compute commands. The draw commands include state information or geometry data associated with vertices of primitives. The compute commands include kernel code or a reference (such as a pointer or an index) to code, arguments, barriers, and the like.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Processing on the GPU is typically initiated by application programming interface (API) calls (e.g., draw calls) that are processed by the CPU. For example, a draw call to perform graphics processing generates a call to a user mode driver (UMD), which generates the appropriate commands and writes them into a command buffer. The commands in the command buffer are written to a queue associated with a virtual pipeline supported by the GPU, which implements a scheduler to schedule the commands from the queue for execution by the virtual pipeline. The scheduler is notified that the commands are available for scheduling using a doorbell, which is a memory-mapped interrupt that is written to indicate that the commands are available in the queue for execution on the GPU. For example, a doorbell associated with a queue is written in response to a new command being added to the queue. For another example, a doorbell associated with a queue that includes a command that is dependent upon one or more instructions is written in response to resolution of the dependency. The scheduler monitors the doorbells associated with a set of queues that are mapped to the scheduler. In response to a doorbell of a mapped queue being written, the scheduler schedules the command at the head of the mapped queue for execution on the GPU. Conventional schedulers are not permitted to read or write doorbells on other GPUs, which makes them unable to check dependencies across GPUs in environments such as rack-mounted GPUs.

FIGS. 1-5 disclose embodiments of techniques for distributing workloads over the GPUs on processing systems that include multiple GPUs, such as rack-mounted systems, by programming the GPUs to read different subsets of commands in a command stream. An application executing on a central processing unit (CPU) provides commands to the GPUs and the subsets of the commands are added to queues in the GPUs that are programmed to execute the subsets, e.g., based on identifiers of the GPUs. In some cases, a command in a queue on one GPU is dependent upon one or more commands in one or more other queues on other GPUs in the processing system. A primary GPU in the processing system maintains a data structure (such as a table) that indicates locations of dependencies associated with commands in the queues of the GPUs. The primary GPU adds entries to the data structure in response to the application providing the command to the GPUs. Entries in the table are associated with doorbells that are written in response to changes in the status of the commands associated with the entries such as resolution of a dependency. Writing a doorbell signals a change in a corresponding entry in the data structure. A scheduler in the primary GPU monitors the status of the doorbells in the table and causes the dependent commands to be released for execution in response to a corresponding doorbell being written to indicate that the dependency has been resolved. In some embodiments, releasing the command includes adding the command to a user queue in the corresponding GPU or a writing a doorbell in the corresponding GPU if the dependent command is already in the user queue. For example, if a first command in the first queue on a first GPU is waiting for resolution of a dependency on a second command that is executing on a second GPU, a scheduler on the primary GPU determines whether the dependency is resolved by monitoring a corresponding entry in the table. In response to the second GPU writing the doorbell associated with the corresponding entry in the table, the primary GPU releases the first command for execution on the first GPU.

Figure 1:
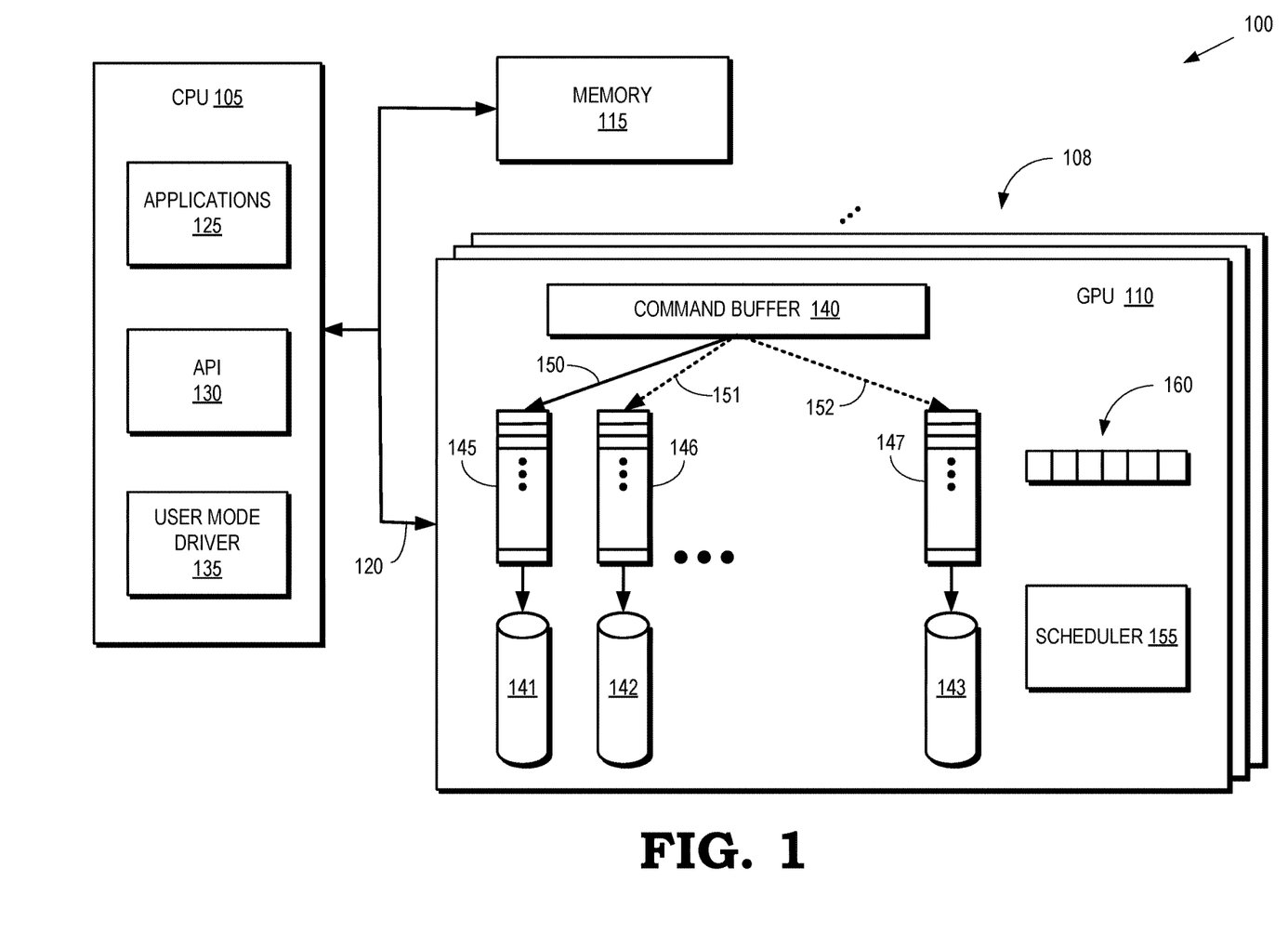
FIG. 1 is a block diagram illustrating a processing system that includes a set of processing units such as rack-mounted graphics processing units (GPUs) in a cloud server according to some embodiments.

FIG. 1 is a block diagram illustrating a processing system 100 that includes a set of processing units such as rack-mounted GPUs in a cloud server according to some embodiments. The processing system 100 includes a central processing unit (CPU) 105 for executing instructions such as draw calls and a set 108 of graphics processing units (GPUs) including the GPU 110 for performing graphics processing and, in some embodiments, general purpose computing. The processing system 100 also includes a memory 115 such as a system memory, which is implemented as dynamic random access memory (DRAM), static random access memory (SRAM), nonvolatile RAM, or other type of memory. The CPU 105, the set 108 including the GPU 110, and the memory 115 communicate over an interface 120 that is implemented using a bus such as a peripheral component interconnect (PCI, PCI-E) bus. However, other embodiments of the interface 120 are implemented using one or more of a bridge, a switch, a router, a trace, a wire, or a combination thereof.

As illustrated, the CPU 105 executes a number of processes, such as one or more applications 125 that generate commands, a user mode driver 135, and other drivers such as a kernel mode driver (not shown in the interest of clarity). The applications 125 include applications that utilize the functionality of the set 108 including the GPU 110, such as applications that generate work in the processing system 100 or an operating system (OS). Some embodiments of the application 125 include one or more graphics instructions that instruct the GPU 110 to render a graphical user interface (GUI), a graphics scene, or other image or combination of images for presentation to a user. For example, the graphics instructions can include instructions that define a set of one or more graphics primitives to be rendered by the GPU 110.

Some embodiments of the application 125 utilize an application programming interface (API) 130 to invoke a user mode driver 135 or other GPU driver. User mode driver 135 issues one or more commands to the set 108 including the GPU 110. The commands instruct one or more of the GPUs in the set 108 to render one or more graphics primitives into displayable graphics images. Based on the graphics instructions issued by application 125 to the user mode driver 135, the user mode driver 135 formulates one or more graphics commands that specify one or more operations for the GPUs in the set 108 to perform for rendering graphics. In some embodiments, the user mode driver 135 is a part of the application 125 running on the CPU 105. For example, a gaming application running on the CPU 105 can implement the user mode driver 135. Similarly, some embodiments of an operating system running on the CPU 105 implement a kernel mode driver (not shown). As discussed herein, the commands generated by the API 130 for some of the applications 125 are distributed to the GPUs in the set 108 so that each of the GPUs in the set 108 executes a different subset of the commands. In that case, the API 130 is used to program the GPUs in the set 108 to execute different subsets of the commands, e.g., by associating the subsets with identifiers of the GPUs in the set 108.

The GPU 110 (and other GPUs in the set 108) receives command buffers 140 from the CPU 105 via the interface 120. The command buffer 140 includes sets of one or more commands for execution by one of a plurality of concurrent graphics pipelines 141, 142, 143, which are collectively referred to herein as "the pipelines 141-143." Queues 145, 146, 147 (collectively referred to herein as "the queues 145-147") are associated with the pipelines 141-143 and hold commands or command buffers for the corresponding queues 145-147. In the illustrated embodiment, the commands in the command buffer 140 are stored in entries of the queue 145 (as indicated by the solid arrow 150), although other command buffers received by the GPU 110 are distributed to the other queues 146, 147 (as indicated by the dashed arrows 151, 152). The command buffers are distributed to the queues 145-147 using a round-robin algorithm, randomly, or according to other distribution algorithms.

A scheduler 155 schedules commands from the head entries of the queues 145-147 for execution on the corresponding pipelines 141-143. The GPU 110 includes a set 160 of doorbells that indicate whether the queues 145-147 are empty or non-empty, i.e., have at least one command in an entry of the non-empty queue. Some embodiments of the set 160 of doorbells are implemented as memory-mapped interrupts. If a queue is mapped to a doorbell in the set 160, writing to the doorbell indicates that the corresponding queue 145-147 is non-empty and includes a command that is ready to be scheduled. In some cases, a command in a queue on one of the GPUs in the set 108 is dependent upon one or more commands in one or more other queues on other GPUs in the set 108. A primary GPU in the set 108 maintains a data structure (not shown in FIG. 1 in the interest of clarity) that indicates locations of dependencies associated with commands in the queues of the GPUs in the set 108. The primary GPU adds entries to the data structure in response to the application providing the command to the GPUs in the set 108. The primary GPU then releases the associated dependent commands for execution on the corresponding GPU in response to resolution of the dependency, as indicated by a corresponding entry in the table.

Figure 2:
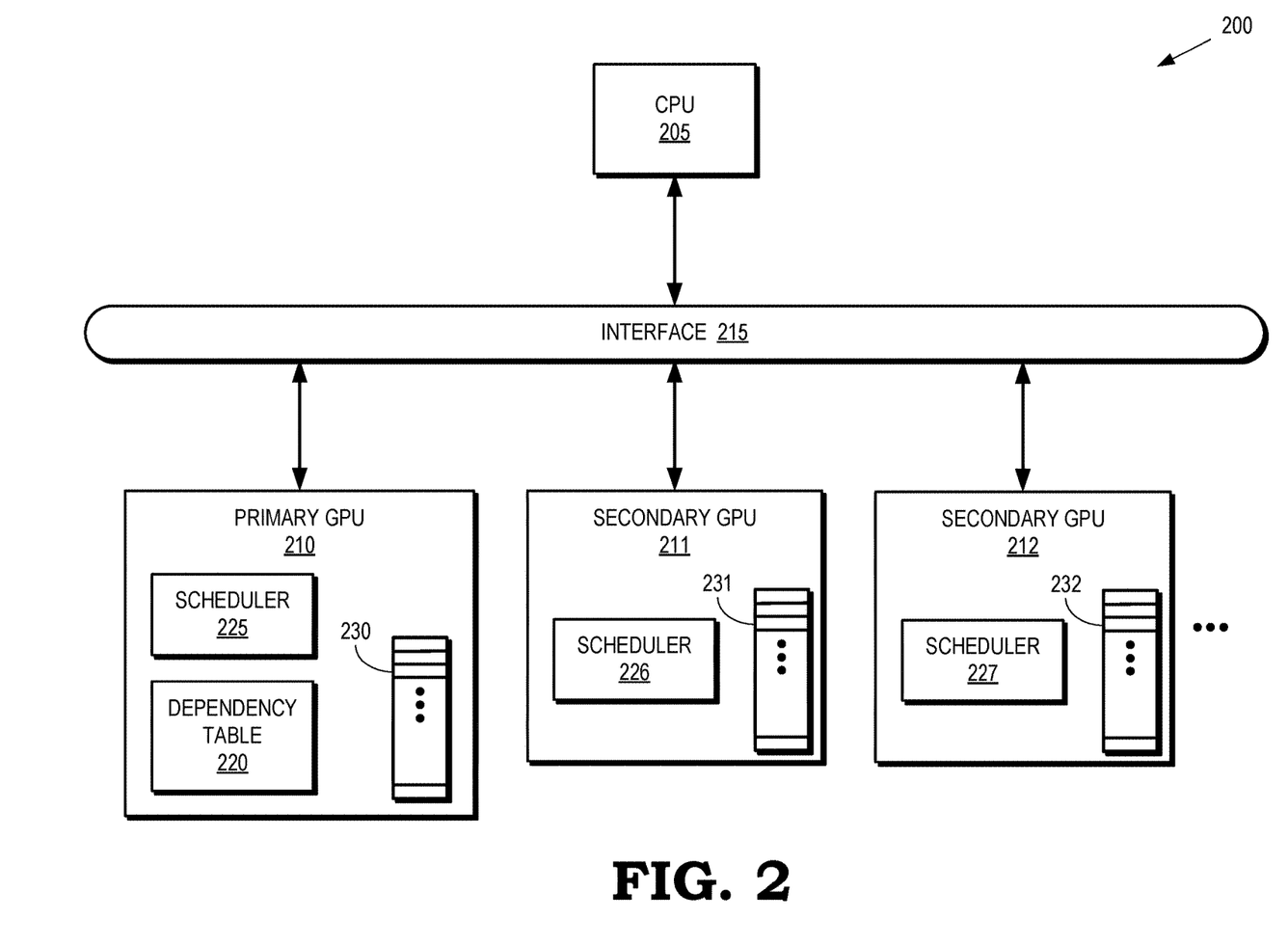
FIG. 2 is a block diagram of a processing system that implements cross-GPU scheduling of dependent processes according to some embodiments.

FIG. 2 is a block diagram of a processing system 200 that implements cross-GPU scheduling of dependent processes according to some embodiments. The processing system 200 is used to implement some embodiments of the processing system 100 shown in FIG. 1. The processing system 200 includes one or more CPUs 205 (only one shown in FIG. 2 in the interest of clarity) and a set of GPUs 210, 211, 212 (collectively referred to herein as "the GPUs 210-212") that are interconnected by an interface 215 such as a PCI bus or a backplane in a rack server.

The GPUs 210-212 are partitioned into a primary GPU 210 and secondary GPUs 211, 212. The primary GPU 210 is responsible for keeping track of dependencies between commands executing on different ones of the GPUs 210-212, preventing execution of dependent commands, and releasing the dependent commands for execution in response to resolution of the dependency. Some embodiments of the primary GPU 210 therefore include a dependency table 220 that includes entries associated with commands executing on one of the GPUs 210-212 that are dependent upon one or more commands executing on other ones of the GPUs 210-212. For example, an entry in the dependency table 220 can indicate that a first command that is to be executed on the secondary GPU 211 is dependent upon a second command that is to be executed on the secondary GPU 212. The primary GPU 210 therefore prevents execution of the first command until the dependency is resolved by completing execution of the second command on the secondary GPU 212. In response to resolution of the dependency, the primary GPU 210 releases the first command for execution on the secondary GPU 211.

In the illustrated embodiment, the GPUs 210-212 include corresponding schedulers 225, 226, 227 (which are collectively referred to herein as "the schedulers 225-227") that schedule execution of commands (or command buffers) that are stored in corresponding queues 230, 231, 232, which are collectively referred to herein as "the queues 230-232." The queues 230-232 are sometimes referred to herein as user queues 230-232. In addition to scheduling commands in the queue 230 for execution, the scheduler 225 in the primary GPU 210 monitors the commands or command buffers in the command stream processed by the GPUs 210-212 and identifies dependencies between the commands in the command stream. In response to identifying a dependency, the scheduler 225 creates a corresponding entry in the dependency table 220. The scheduler 225 also prevents the GPUs 210-212 from executing dependent commands, e.g., by preventing the commands from being dispatched to the queues 230-232 or by clearing doorbells associated with the corresponding entries in the queues 230-232 to indicate that the commands in the entries are not ready for execution.

The schedulers 225-226 provide indications (such as interrupts, messages, or written doorbells) to the primary GPU 210 via the interface 215 to notify the primary GPU 210 that execution of a command has resolved the dependency. For example, the scheduler 227 in the secondary GPU 212 can write a doorbell associated with an entry in the dependency table 220 to indicate that a dependency with another command to be executed on the secondary GPU 211 has been resolved. In response to receiving the notification, the scheduler 225 notifies the GPU 210-212 that includes the dependent command, e.g., by dispatching the command to the corresponding queue 230-232 or by writing a doorbell associated with the corresponding entry in the queue 230-232. The dependent command is then executed in response to the release.

Figure 3:
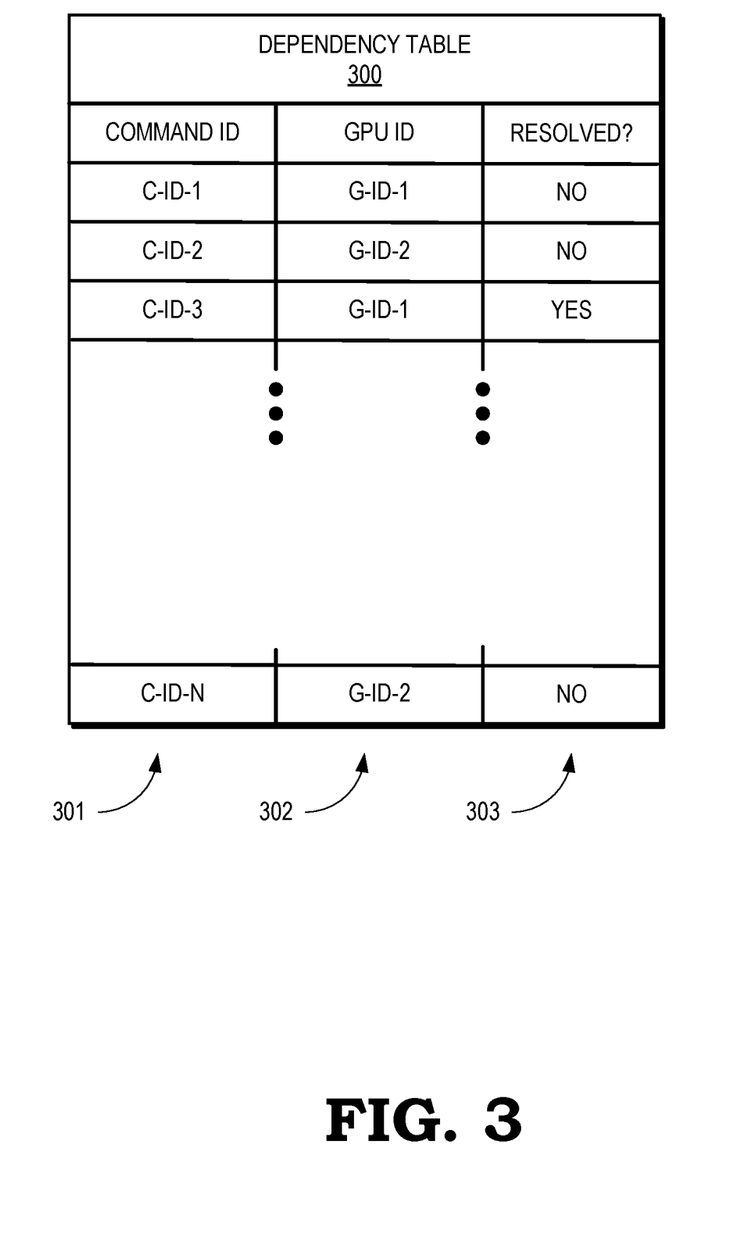
FIG. 3 is a block diagram of a dependency table that is used to indicate dependencies between commands executing on different GPUs in a processing system according to some embodiments.

FIG. 3 is a block diagram of a dependency table 300 that is used to indicate dependencies between commands executing on different GPUs in a processing system according to some embodiments. The dependency table 300 is used to implement some embodiments of the dependency table 220 shown in FIG. 2. The dependency table 300 includes information that is used to record cross-GPU dependencies between commands, as well as information that indicates whether the dependencies have been resolved so that the dependent commands can be executed. In the illustrated embodiment, the dependency table 300 includes a first column 301 that stores identifiers of the dependent commands, a second column 302 that stores an identifier of the GPU that executes the dependent commands, and third column 303 that indicates whether the dependency has been resolved. For example, a first entry in the dependency table 300 includes a first command identifier (C-ID-1) in the first column 301 and an identifier (G-ID-1) in the second column 302 of a first GPU that executes the first command once the dependency has been resolved. The third column 303 of the first entry indicates that the dependency has not been resolved. Entries in some embodiments of the dependency table 300 include additional information such as an identifier of the command that needs to complete to resolve the dependency, the GPU that is executing the command that needs to complete to resolve the dependencies, and the like.

Figure 4:
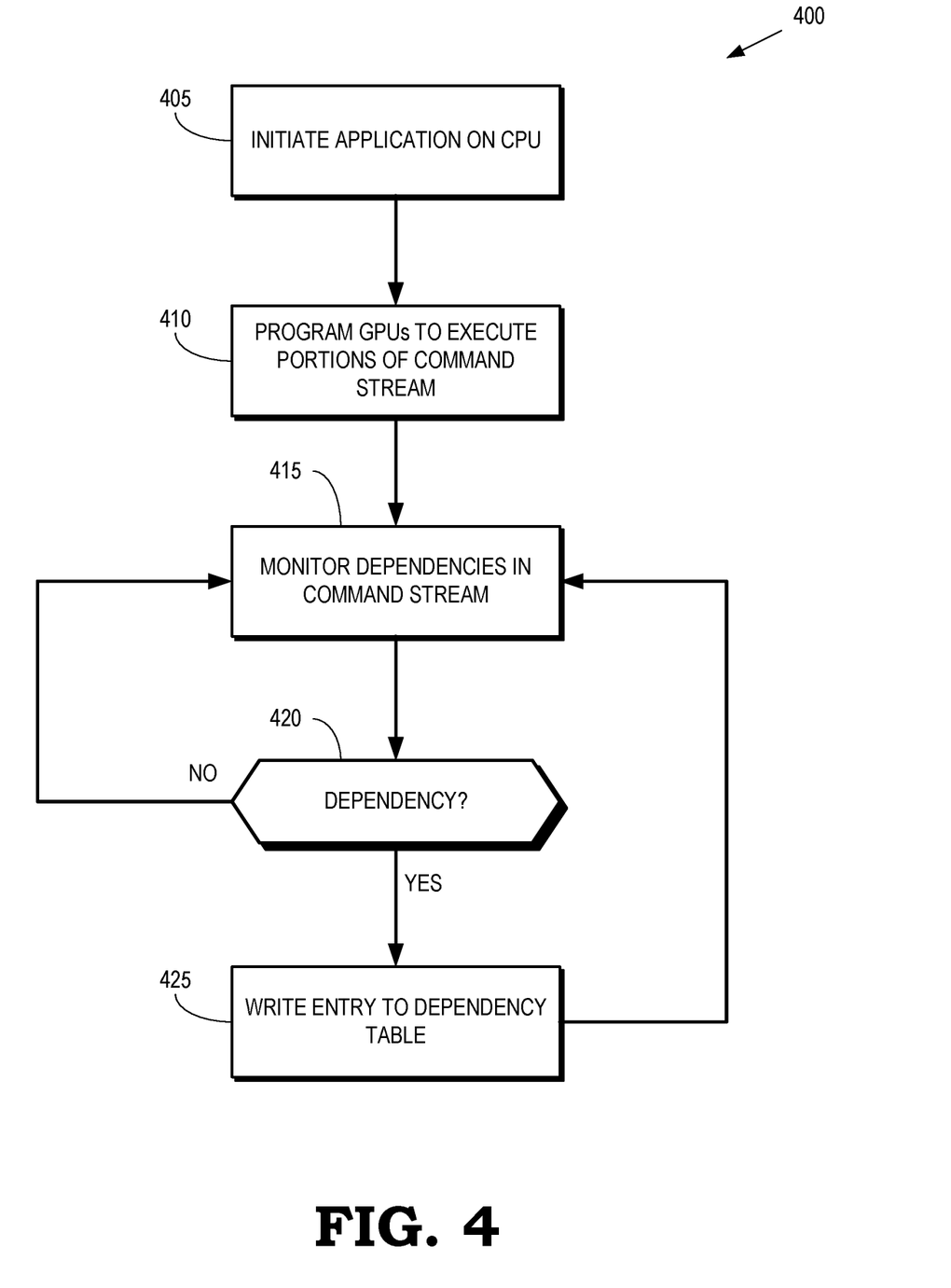
FIG. 4 is a flow diagram of a method of configuring a dependency table to record cross-GPU command dependencies according to some embodiments.

FIG. 4 is a flow diagram of a method 400 of configuring a dependency table to record cross-GPU command dependencies according to some embodiments. The method 400 is used to configure some embodiments of the dependency table 300 shown in FIG. 1. As discussed herein, the dependency table is stored in a primary GPU that is responsible for monitoring dependencies in a set of GPUs.

At block 405, a CPU initiates execution of an application that generates a command stream including commands to be executed on a set of GPUs. Subsets of the commands in the command stream are to be executed on corresponding subsets of the set of GPUs. For example, a first subset of the commands in the command stream are assigned to a first GPU for execution and a second subset of the commands in the command stream are assigned to a second GPU for execution.

At block 410, the GPUs are programmed to execute the corresponding subsets of the commands. In some embodiments, different subsets of the commands are associated with identifiers of different GPUs. The GPUs receive all the commands in the command stream but each GPU only executes the subsets of the commands that are associated with its identifier. Programming of the GPUs is performed by the CPU, the primary GPU, or other entity.

At block 415, the primary GPU monitors commands in the command stream to detect dependencies between commands that are assigned to different GPUs. At decision block 420, the primary GPU determines whether a dependency has been detected between commands that are assigned to different GPUs. If not, the method 400 flows back to block 415 and the primary GPU continues to monitor the command stream. If a dependency is detected, the method 400 flows to block 425.

At block 425, the primary GPU writes an entry to the dependency table to record the detected dependency between commands assigned to different GPUs. As discussed herein, the entry in the dependency table can include an identifier of the dependent command, an identifier of the GPU that is assigned to execute the dependent command, an indication of whether the dependency has been resolved, as well as other information including an identifier of the command that needs to complete to resolve the dependency, an identifier of the GPU that is executing the command that needs to complete to resolve the dependencies, and the like.

Figure 5:
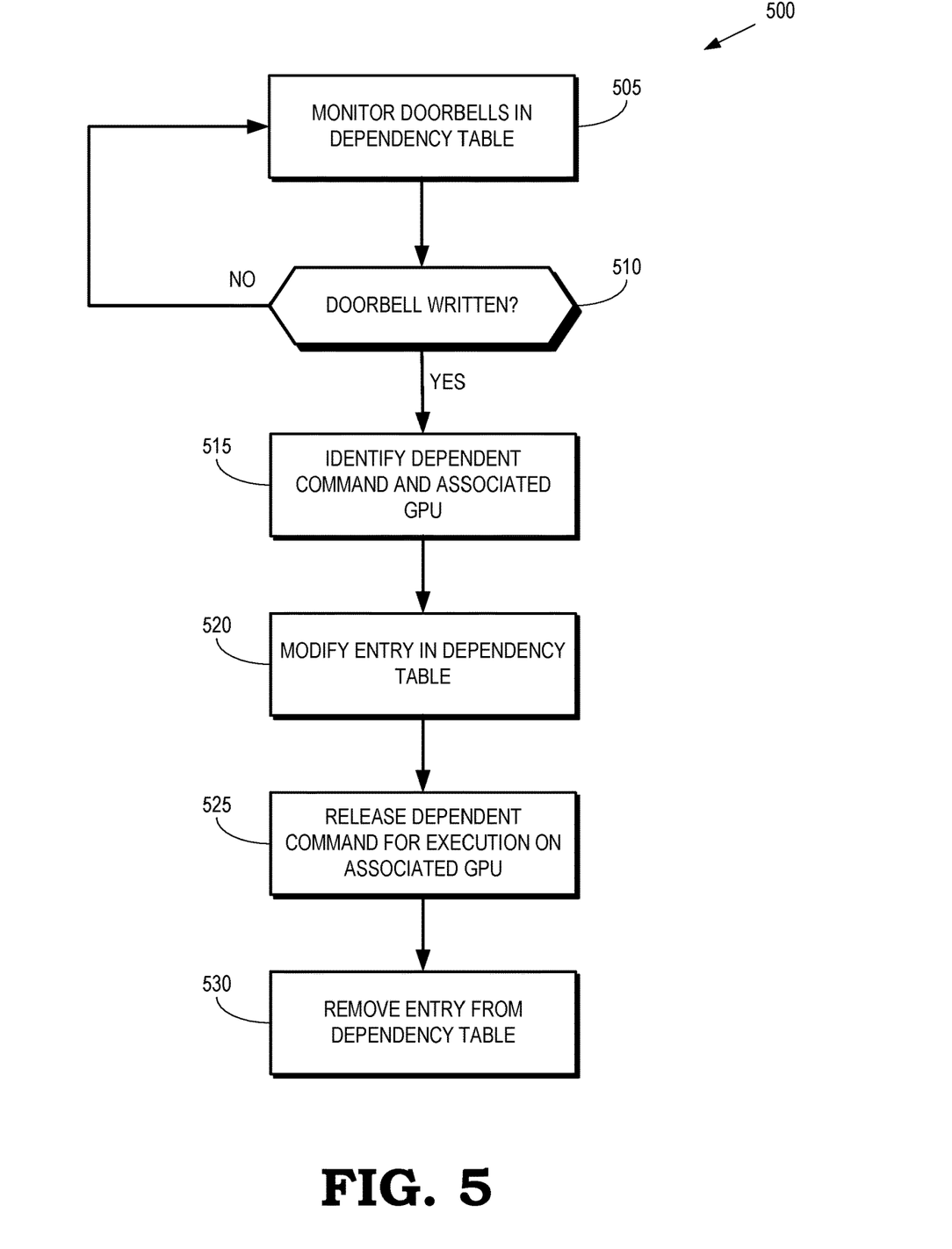
FIG. 5 is a flow diagram of a method of releasing dependent commands for execution using a cross-GPU dependency table according to some embodiments.

FIG. 5 is a flow diagram of a method 500 of releasing dependent commands for execution using a cross-GPU dependency table according to some embodiments. The method 500 is used to release dependent commands for execution based on some embodiments of the dependency table 300 shown in FIG. 1. As discussed herein, the dependency table is stored in a primary GPU that is responsible for detecting resolution of dependencies and releasing the dependent commands.

At block 505, the primary GPU monitors information indicating whether dependencies associated with commands in entries of the dependency table have resolved. In some embodiments, the information is a doorbell that is written by the GPU that is executing the command that completes to resolve the dependency.

At decision block 510, the primary GPU determines whether the doorbell for entry including a dependent command has been written. If not, the method 500 flows back to block 505 and the primary GPU continues to monitor the dependency information. If the doorbell has been written to indicate that the dependency has resolved, the method 500 flows to block 515.

At block 515, the primary GPU accesses the dependency table to identify the dependent command and the associated the GPU that is to execute the dependent command. At block 520, the primary GPU modifies the entry in the dependency table to indicate that the dependency has been resolved. Although blocks 515, 520 are shown as sequential in FIG. 5, the blocks 515, 520 are executed in different orders or concurrently in some embodiments.

At block 525, the primary GPU releases the dependent command for execution on the associated GPU. In some embodiments, the dependent command is released by providing the dependent command to a queue in the GPU that is to execute the dependent command. In some embodiments, the dependent command is released by writing a doorbell associated with an entry in a queue in the GPU that includes the dependent command. At block 530, the primary GPU removes the entry associated with the dependent command from the dependency table.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is either embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A first processing unit comprising:
   a plurality of queues configured to store commands prior to execution in a corresponding plurality of pipelines;
   a first table configured to store entries indicating dependencies between commands that are to be executed on different ones of a plurality of processing units comprising the first processing unit and at least one second processing unit; and
   a first scheduler configured to release commands in the entries at the different ones of the plurality of processing units in response to resolution of the dependencies.

2. The first processing unit of claim 1, wherein the first scheduler is configured to program the plurality of processing units to execute subsets of the commands in a command stream.

3. The first processing unit of claim 2, wherein the first scheduler is configured to identify dependencies between the commands in the command stream and to create entries in the first table in response to identifying the dependencies.

4. The first processing unit of claim 3, wherein the entries in the first table comprise information identifying a first command that is dependent upon a second command, information identifying one of the plurality of processing units that is executing the second command, and information indicating whether the dependency has been resolved.

5. The first processing unit of claim 4, wherein the first scheduler is configured to update the entries in the first table in response to the dependencies being resolved.

6. The first processing unit of claim 1, wherein the first scheduler is configured to add the commands in the entries to corresponding user queues in response to resolution of the dependencies.

7. The first processing unit of claim 1, wherein the first scheduler is configured to write doorbells associated with the commands in response to resolution of the dependencies.

8. A first processing unit, comprising:
   a plurality of pipelines configured to execute a first subset of commands in a command stream, wherein at least one of the first subset of commands is dependent upon at least one of a second subset of commands that is to be executed on a second processing unit;
   a plurality of queues configured to store the first subset of commands prior to execution in the plurality of pipelines; and
   a scheduler configured to schedule the at least one of the first subset of commands for execution by the plurality of pipelines in response to the dependency being resolved.

9. The first processing unit of claim 8, wherein the plurality of pipelines is configured to execute the first subset of commands in the command stream based on instructions received from a primary processing unit.

10. The first processing unit of claim 9, wherein the scheduler is configured to schedule the at least one of the first subset of commands in response to the second processing unit providing an indication to the primary processing unit that execution of the at least one of the second subset of commands is complete.

11. The first processing unit of claim 10, wherein the scheduler receives an indication from the primary processing unit that the at least one of the first subset of commands is released for execution by the plurality of pipelines in response to the dependency being resolved.

12. The first processing unit of claim 11, wherein the indication from the primary processing unit comprises provision of the at least one of the first subset of commands to the plurality of queues in response to the dependency being resolved.

13. The first processing unit of claim 11, wherein the at least one of the first subset of commands is stored in the plurality of queues prior to the dependency being resolved, and wherein the indication from the primary processing unit comprises a doorbell associated with the at least one of the first subset of commands, the doorbell being written by the primary processing unit in response to the dependency being resolved.

14. The first processing unit of claim 11, wherein the scheduler receives the indication via an interface that connects the first processing unit, the second processing unit, and the primary processing unit.

15. A first processing unit, comprising:
a plurality of pipelines configured to execute a first subset of commands in a command stream, wherein at least one of a second subset of commands that is to be executed on a second processing unit is dependent upon at least one of the first subset of commands;
a plurality of queues configured to store the first subset of commands prior to execution the plurality of pipelines; and
a scheduler configured to schedule the at least one of the first subset of commands for execution by the plurality of pipelines in response to the dependency being resolved and to notify a primary processing unit in response to completing execution of the at least one of the first subset of commands.

16. The first processing unit of claim 15, wherein the plurality of pipelines is configured to execute the first subset of commands in the command stream based on instructions received from the primary processing unit.

17. The first processing unit of claim 15, wherein the scheduler is configured to notify the primary processing unit based on information indicating dependency of the at least one of the second subset of commands on the at least one of the first subset of commands.

18. The first processing unit of claim 17, wherein the scheduler is configured to write a doorbell in a table maintained by the primary processing unit in response to completing execution of the at least one of the first subset of commands.

19. The first processing unit of claim 18, wherein the at least one of the second subset of commands is released for execution on the second processing unit in response to the scheduler writing the doorbell in the table maintained by the primary processing unit.

20. The first processing unit of claim 17, wherein the scheduler is configured to notify the primary processing unit via an interface that connects the first processing unit, the second processing unit, and the primary processing unit.

* * * * *